(12) United States Patent  (10) Patent No.: US 7,487,147 B2
Bates et al.  (45) Date of Patent: Feb. 3, 2009

(54) PREDICTIVE USER INTERFACE

(75) Inventors: John P. Bates, Foster City, CA (US);
Payton R. White, Foster City, CA (US);
Yutaka Takeda, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 442 days.

(21) Appl. No.: 11/181,540

(22) Filed: Jul. 13, 2005

(65) Prior Publication Data

US 2007/0016572 A1  Jan. 18, 2007

(51) Int. Cl.
G06F 7/00 (2006.01)
G06F 3/00 (2006.01)
G06F 3/048 (2006.01)

(52) U.S. Cl. .......................... 707/5; 715/834; 715/835; 715/789

(58) Field of Classification Search ............... 707/5, 707/1; 715/789, 835, 834
See application file for complete search history.

(56) References Cited

U.S. PATENT DOCUMENTS 5,128,672 A  7/1992  Kaehler
5,488,725 A *  1/1996  Turtle et al. .................. 707/5
5,963,671 A  10/1999  Comerford et al.
6,317,683 B1 *  11/2001  Ciprian et al. ............. 701/118
6,573,844 B1  6/2003  Venolia et al.
6,998,971 B2 *  2/2006  Ito et al. ..................... 340/438

OTHER PUBLICATIONS

International Search Report mailed on Jan. 31, 2008, for PCT Application No. PCT/US06/27525 filed on Jul. 13, 2006, 2 pages.

* cited by examiner

Primary Examiner—Vincent F Boccio
(74) Attorney, Agent, or Firm—Townsend and Townsend and Crew LLP

(57) ABSTRACT

A user interface enables the input of text and other complicated inputs by identifying entities having an increased likelihood of being selected and decreasing the precision needed to select these entities. The user interface displays a set of entities in a radial pattern. The user manipulates a pointer with a joystick or other input device to select entities. The entities having a higher selection probabilities are allocated more space in the pattern than the other entities. The entities having a higher selection probabilities may also be emphasized with visual cues. Selection probabilities may be determined by comparing a sequence of entities previously selected, such as a partially input word, with a set of commonly selected sequences of entities, such as a set of words commonly used by users. The user interface can display a list of words corresponding with a sequence of selected entities, including characters from different writing systems.

21 Claims, 8 Drawing Sheets

PREDICTIVE USER INTERFACE

BACKGROUND OF THE INVENTION

The invention relates to field of user interfaces for computers and electronic devices. Keyboards are the most common input devices for computers. Keyboards enable computers to receive text and other complicated inputs. However, portable electronic devices, including handheld computers, electronic organizers, personal digital assistants, portable game systems, wireless phones, are often too small to include a standard size keyboard. As a result, they require alternative input devices for receiving text and other complicated inputs.

One user interface displays a virtual keyboard on a screen and allows users to manipulate a cursor, using a joystick, directional pad, or other input device, to select letters on the virtual keyboard. This approach is time-consuming, often requiring many button presses to select each letter.

One user interface includes a small keyboard designed to be operated by a user's thumbs. Unfortunately, the thumb keyboard requires two hands to operate, is too large for many portable electronic devices, and has a steep learning curve.

Another user interface input device maps letters of the alphabet to the keys of a standard telephone keypad. A set of multiple letters is mapped to each of at least a portion of the keys. To enter text, the user presses each key one or more times to select one of the set of letters associated with that key. A selection is completed by waiting for a predetermined period of time or by pressing another button. One disadvantage of this approach is that text entry is very slow, often requiring multiple button presses and long pauses for each letter.

A variation of this user interface is referred to as T9. T9 is a predictive text input system that attempts to reduce the number of button presses required for each letter. Like standard telephone keypad-based text input, a set of multiple letters is mapped to each of at least a portion of the keys. To enter words, the user only needs to press each key associated with a letter once. Because there are multiple letters associated with each key, an input sequence can correspond to many different combinations of letters. As the user enters a word, the system accesses a dictionary or other database to identify the word or words likely to correspond with a given input sequence. If there are multiple words associated with a sequence of inputs, the user interface allows the user to select the desired word. Although telephone keypads take less space than a thumb keyboard, few devices besides wireless phones have telephone keypads. Additionally, these user interfaces are limited to text input and are difficult or impossible to use with languages having a large number of characters, such as Chinese and Japanese.

It is therefore desirable for a user interface of an electronic device to enable quick and efficient entry of text and other complicated inputs. It is further desirable for the user interface to use minimal space for input devices and to be easily integrated with a wide variety of types of electronic devices. It is also desirable for the user interface to enable users to enter text for languages having a large number of characters. It is desirable for the user interface to handle non-text input. It is desirable that the user interface can be operated with only one hand.

BRIEF SUMMARY OF THE INVENTION

An embodiment of the invention includes a user interface that enables the input of text and other complicated inputs by identifying entities having an increased likelihood of being selected and decreasing the precision needed to select these entities. The user interface displays a set of entities in a radial pattern. The user manipulates a pointer with a joystick or other input device to select entities. The entities having a higher selection probabilities are allocated more space in the pattern than the other entities. The entities having a higher selection probabilities may also be emphasized with visual cues. Selection probabilities may be determined by comparing a sequence of entities previously selected, such as a partially input word, with a set of commonly selected sequences of entities, such as a set of words commonly used by users. The user interface can display a list of words corresponding with a sequence of selected entities, including characters from different writing systems. In embodiments, the user interface enables the selection of entities including characters used to write a language, and icons representing applications and data files.

In an embodiment, a method of processing input provided via an input device includes receiving an input value from an input device, mapping the input value to one of a set of entities, determining a set of selection probabilities for each of at least a portion of the set of entities, creating a new mapping for the set of entities, the new mapping defining associations between potential input values and the set of entities, and displaying the set of entities. In a further embodiment, the method includes receiving a second input value from an input device and mapping the second input value to one of a set of entities using the new mapping.

In an embodiment, displaying the set of entities includes arranging the set of entities in a radial pattern such that each of at least a portion of the set of entities is allocated space in the pattern proportional to its selection probability. In another embodiment, determining a set of selection probabilities includes a dictionary module adapted to determine the set of selection probabilities for the set of entities based on at least the entity corresponding to the input value and a representative sample of sequences of entities selected by typical users. In still another embodiment, displaying the set of entities includes applying a visual cue to each of at least a portion of the set of entities based on its associated selection probability. The visual cue adapted to visually distinguish the entity. The visual cue can include a color and/or a radial offset applied to the position of the entity.

In a further embodiment, the method includes displaying a list of words in response to a sequence of entities selected by a user. In one embodiment, the sequence of entities may form a portion of a word being input by a user and each of the list of words matches the portion of the word. In another embodiment, the sequence of entities may form at least a portion of a word using a first set of characters and each of the list of words corresponds to the sequence of entities using a second set of characters.

BRIEF DESCRIPTION OF THE DRAWINGS

The invention will be described with reference to the drawings, in which.

DETAILED DESCRIPTION OF THE INVENTION

Figure 1:
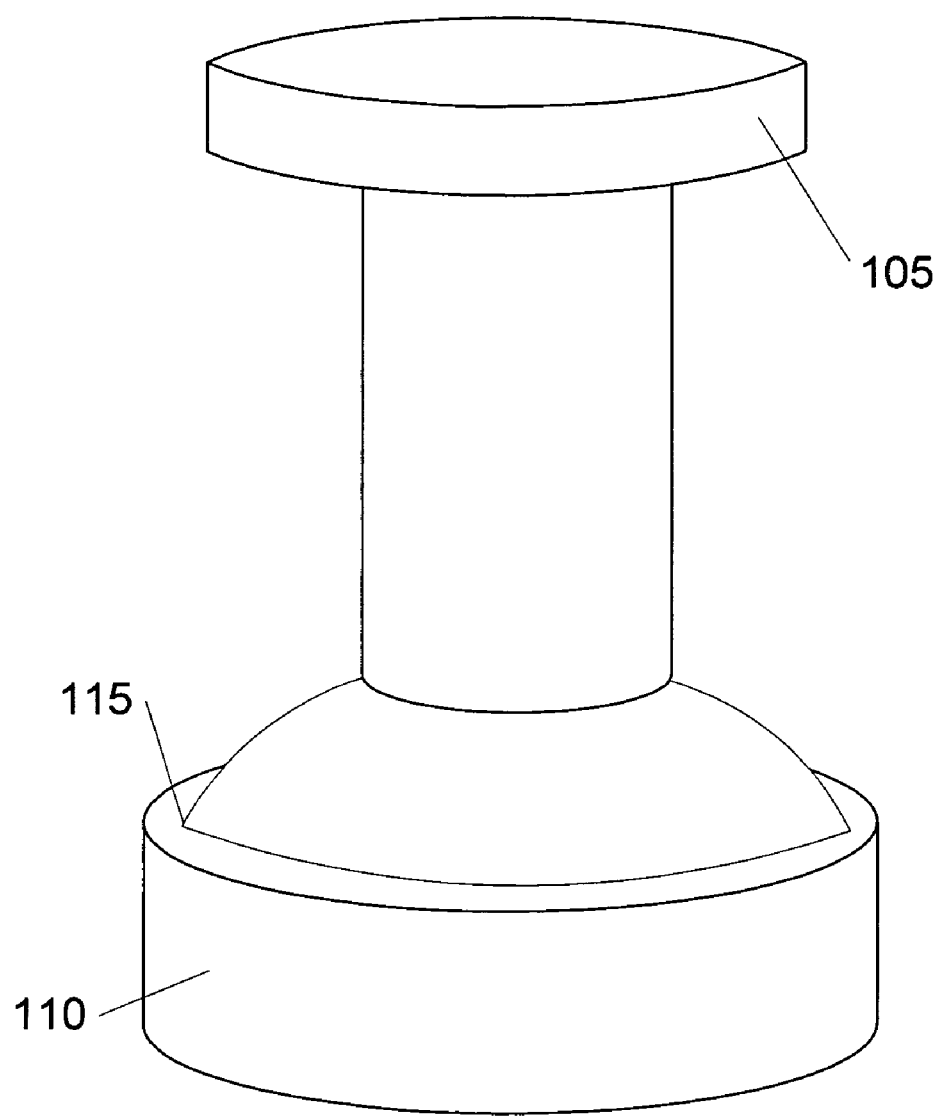
FIG. 1 illustrates an input device suitable for use with an embodiment of the invention.

FIG. 1 illustrates an input device 100 suitable for use with an embodiment of the invention. In this embodiment, input device 100 is a joystick adapted to provide at least two axes of motion. Input device 100 includes a stick 105 that is movable along at least two independent axes of motion. As the stick 105 is moved, the input device provides one or more data values representing the angle of the stick 105 relative to a base 110. In an embodiment, the joystick is an analog joystick, capable of providing a range of data values along each axis of motion. The data values are proportional to the angle of the stick 105 relative to base 110. Despite its name, the analog joystick can provide its data values in a digital format suitable for use with digital computers and device. In a further embodiment, a spring or other mechanism automatically centers the joystick when pressure from the user is released.

Input device 100 can be integrated into a portable electronic device such as a handheld computer, electronic organizer, personal digital assistant, digital music or video player, portable game system, and/or wireless phone. The stick 105 may be sized and positioned on a portable electronic so as to be manipulated with the tip of a user's thumb or finger.

In an embodiment, the stick 105 and base 110 meet at a roughly circular edge 115. Edge 115 limits the motion of the stick 105 in the radial direction. However, when the stick 105 is pushed against edge 115, the stick 105 is free to slide along the edge 115, which changes the position of the stick 105 along the circumference of the circle defined by the edge 115.

In alternate embodiments, other input devices can be used in place of a joystick, such as a touch-sensitive pad or transducer, a rotating knob or wheel, or a scroll wheel.

Figure 2:
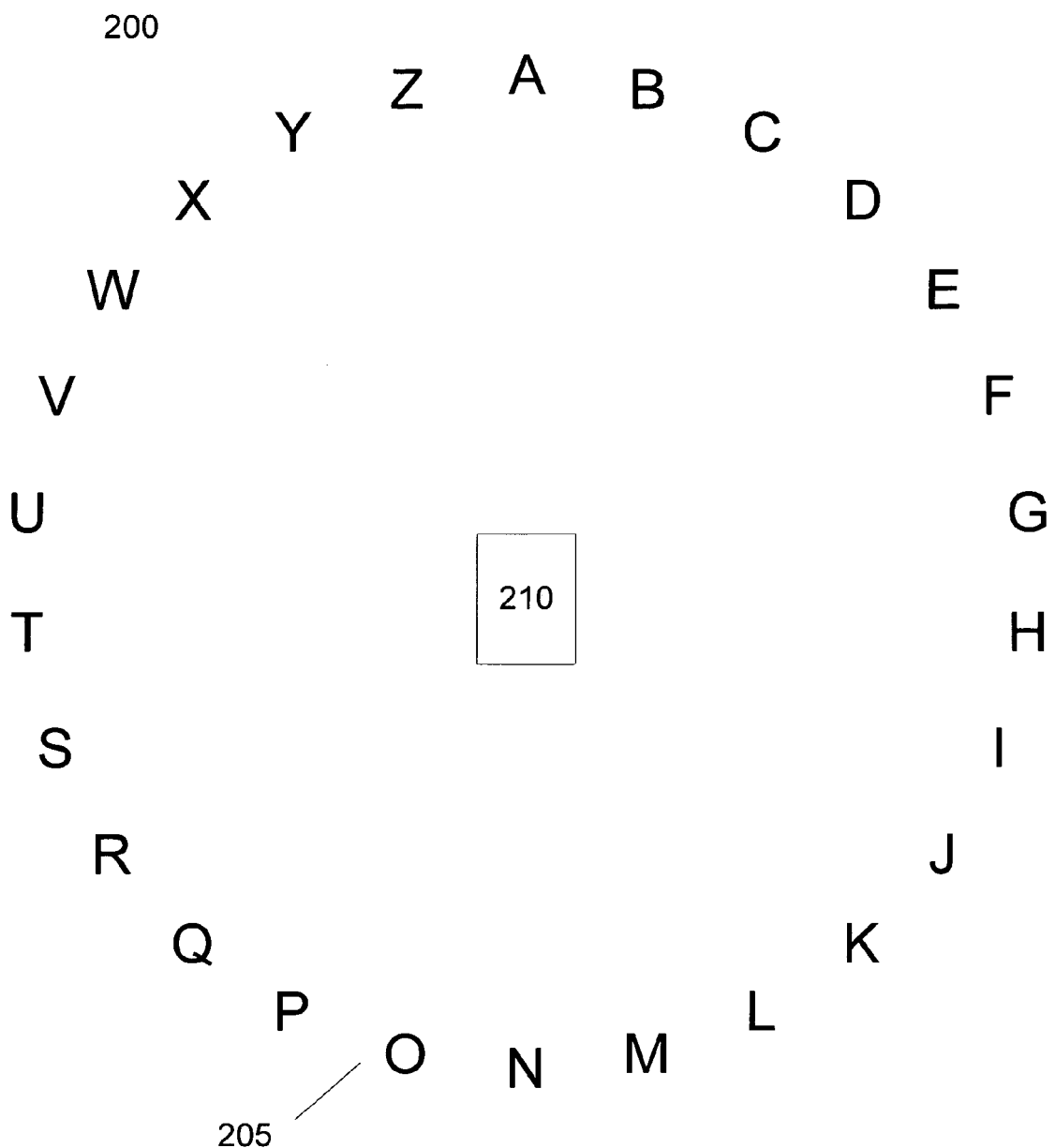
FIG. 2 illustrates an example screen display of a user interface in an initial state according to an embodiment of the invention.

FIG. 2 illustrates an example screen display 200 of a user interface in an initial state according to an embodiment of the invention. Example screen display 200 shows an embodiment of the user interface in an initial state. The user interface includes a set of letters 205 arranged in a circle. In its initial state, this embodiment of the user interface distributes the set of letters 205 equally around the circle. However, as discussed in detail below, this distribution can change in subsequent states of the user interface.

An embodiment of the user interface also includes a pointer 210 used to select a letter in the set of letters 205. In an embodiment, the input device 100 controls the location of the pointer 210 on the screen display. In this embodiment, the user selects a letter by manipulating the input device 100 to position the pointer 210 over the desired letter in the set of letters 205. In an embodiment, the user confirms the selection of a letter by pressing a button. In another embodiment, the user confirms the selection by releasing pressure from the input device 100, causing the pointer 210 to return to a center position. In this embodiment, the last letter contacted by the pointer 210 prior to the release of the input device 100 is confirmed as the user's selection. In further embodiments, the sensitivity of the input device 100 is increased when the pointer 210 is positioned over the set of letters 205, so as to assist the user in selecting a letter. In an embodiment, the sensitivity can be modified by changing the value of a scaling factor applied to input values received from the input device 100.

As shown in FIG. 2, the set of letters 205 includes all of the letters of the English language alphabet. In another embodiment, the set of letters can also include or more commonly used symbols, such as punctuation marks, or other symbols representing functions, such as a symbols for functions corresponding to a space bar, a shift key, and/or an enter key on a traditional keyboard. In other embodiments, the set of letters 205 includes letters suitable for other languages. In a further embodiment, the user can select from several different sets of letters to be displayed. For example, a first set of letters can include capital letters, a second set of letters can include lower case letters, and a third set of letters can include commonly used symbols, such as @, %, and $. Alternative sets of letters can be selected using a control button or in an embodiment by using the pointer 210 to select an icon representing an alternate set of letters.

Figure 3A:
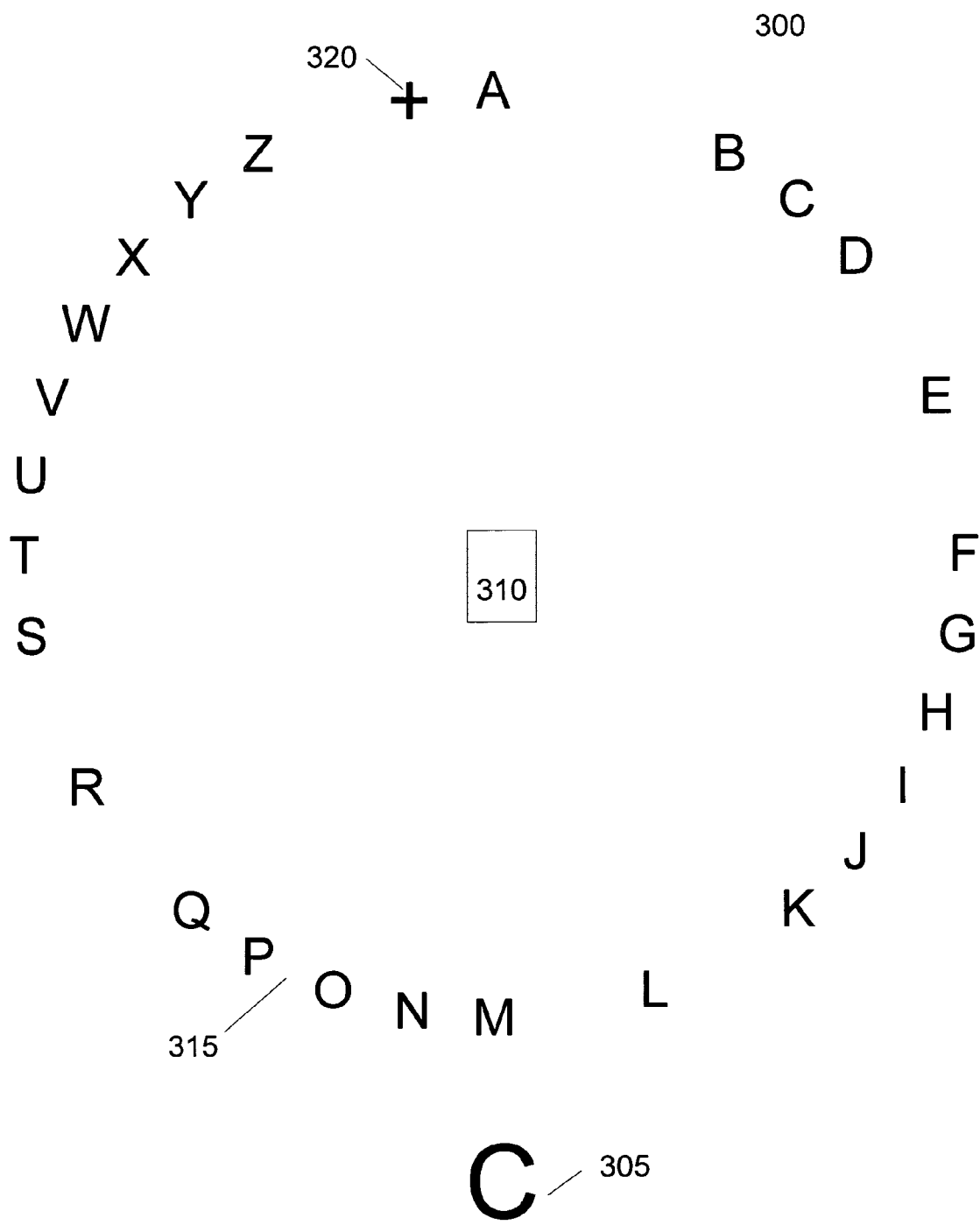
FIGS. 3A-3B illustrate example screen displays of a user inter interface in subsequent states according to an embodiment of the invention.
Figure 3B:
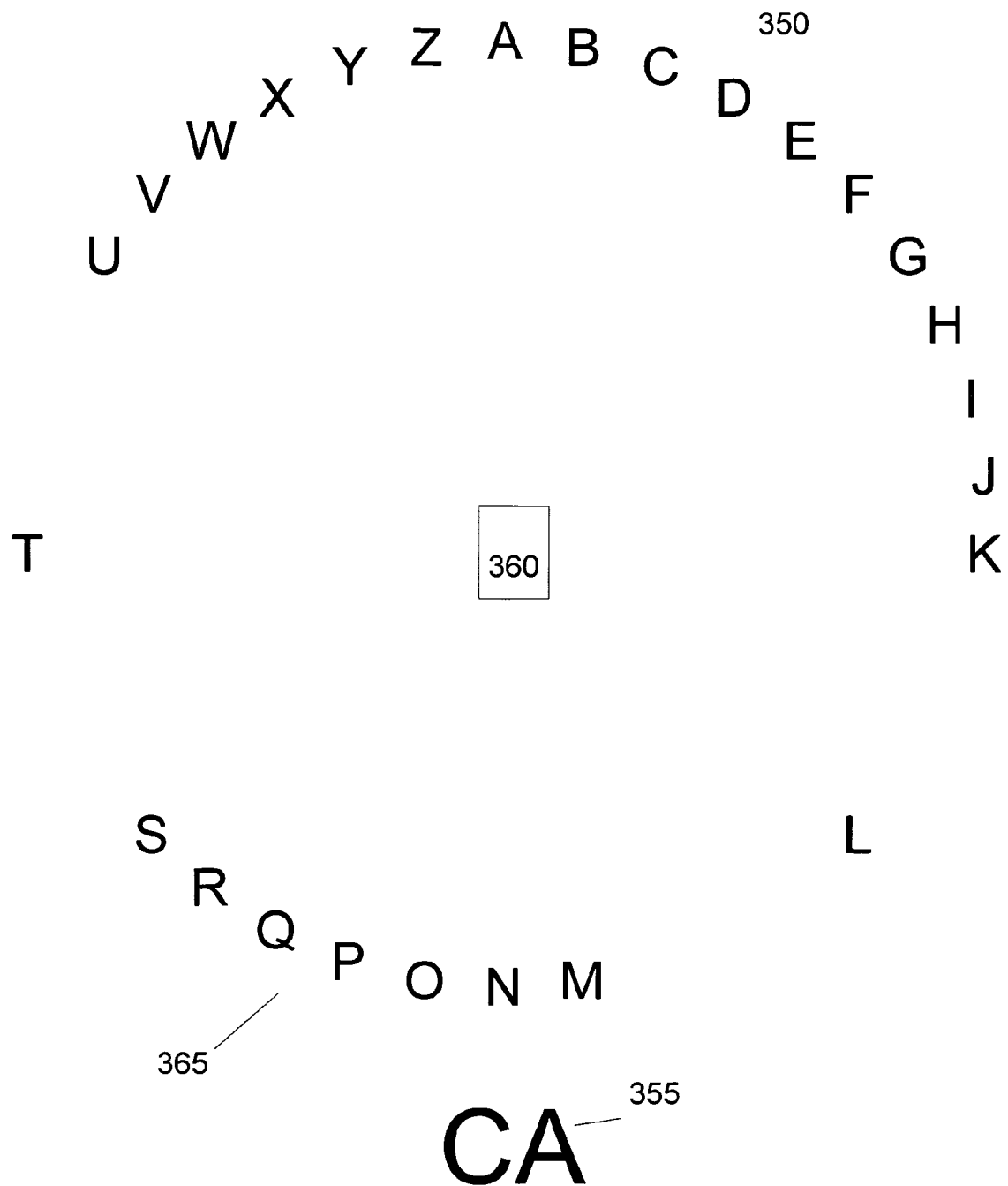

FIGS. 3A-3B illustrate example screen displays of a user inter interface in subsequent states according to an embodiment of the invention. In FIG. 3A, example screen display 300 corresponds with a state of the user interface following the selection and confirmation of a first letter. In this example, screen display 300 includes a selected letter display 305 showing the user letters previously selected with the user interface. In this example, selected letter display 305 shows the letter "C."

Example screen display 300 also includes a pointer 310 and set of letters 315 to enable the user to select another letter to follow the previously selected letter or letters. Additional letters are selected in a similar manner as that discussed above. However, the letters in the set of letters 315 are not equally distributed around the circle. Instead, an embodiment of the invention analyzes the previously selected letter or letters to determine a subset of one or more letters that is likely to be chosen next by the user. This can be determined by comparing the letter or letters previously selected with a database of commonly used words. This embodiment of the user interface then allocates more space around the circle for the subset of letters more likely to be selected, which makes it easier for the user to select one of the letters of this subset.

In example screen display 300, the letter "C" was previously selected. Continuing with this example, this embodiment of the user interface may determine that the word being entered by the user is most likely "cat," "call," "cell," "clear," or "cram." As only the first letter has been entered at this stage, the subset of letters more likely to be selected will include the second letters of each of this set of words. In this case, the subset of letters includes "a," "e," "l," and "r." The example screen display 300 then allocates more space for this subset of letters.

In an embodiment, the space along the circumference of the circle is associated with an adjacent letter. Thus, if the pointer 310 moves to point 320, the letter "A" will be selected. In another embodiment, the space allocated for each letter is proportional to its relatively probability of being selected. For example, if the set of words "cat," "call," "cell," "clear," and "cram" are all equally likely to be selected, then the letter "a," which is the second letter of two different words, will be twice as likely to be selected as the other letters "e," "l," and "r." To reflect this, the letter "a" will be allocated more space than the letters ," "e," "l," and "r."

FIG. 3B illustrates an example screen display 350 corresponding to a subsequent state of the user interface according to an embodiment of the invention. Continuing from the example of FIG. 3A, this example assumes the user has selected the letter "a." In this state, the selected letter display 355 displays the letters "CA." As discussed in the example above, the user interface determines that the word most likely being entered is either "cat" or "call." Thus, the subset of letters likely to be selected in this state of the user interface is "t" and "l." Accordingly, the letters "t" and "l" are allocated more space in the set of letters 365, which makes it easier for the pointer 360 to select these letters.

Figure 4:
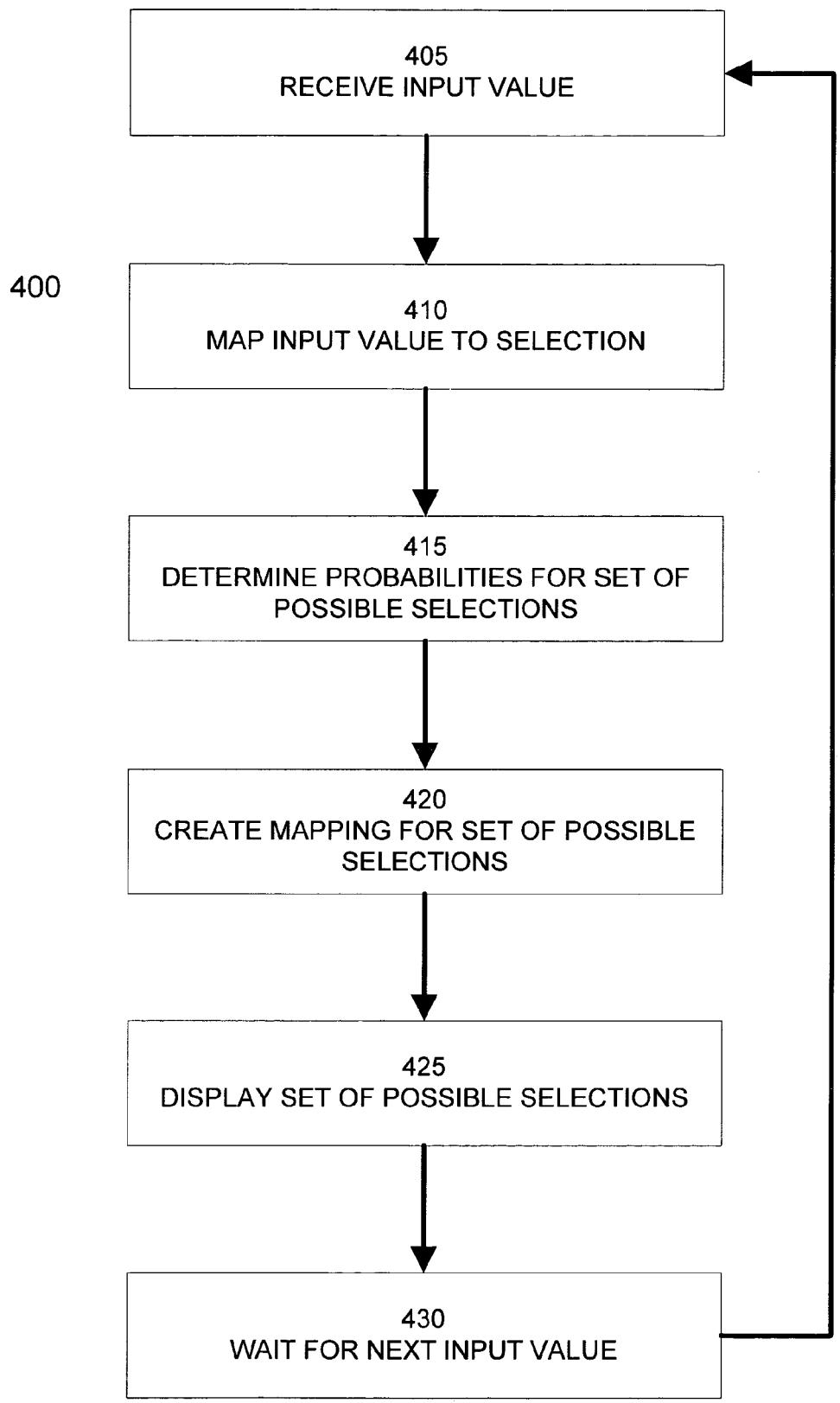
FIG. 4 illustrates a method of operation for a user interface according to an embodiment of the invention.

FIG. 4 illustrates a method of operation 400 for a user interface according to an embodiment of the invention. At step 405, an input value is received from an input device. In an embodiment, the input value includes x and y coordinates specifying the angle of the stick of a joystick. In other embodiments, alternative coordinate systems, such as polar coordinates, can be used to express the input value.

Step 410 maps the input value to a selection. In an embodiment, a table is constructed that associates each selection, such as a letter or other item, to a range of angles around the circumference of the circle. Step 410 then identifies the range of angles containing the input value and selects the associated selection. A default table, which for example assigns equal space for each selection, can be used for an initial iteration of the method 400. For subsequent iterations of method 400, an updated table created in a previous iteration of step 420 is used by step 405, as discussed below.

Alternate embodiments of step 410 can use more complicated associations between input values and selections. For example, each selection can include an assigned center position and an associated probability based on the current state of the user interface. A weighting function for each selection provides an output proportional to the selection's probability and inversely proportional to the distance of an input value at a given point from the selection's assigned position. For example, the weighting function may be a quadratic curve. To map an input value to a selection, this example evaluates the weighting functions of two or more selections using the input value provided by step 405. The selection associated with the weighting function having the highest value at the input value is selected. The weighting functions for each selection can be updated by step 420, discussed below, to reflect changes in the probabilities associated with each selection.

Step 415 determines the probabilities associated with the set of selections, such as the set of letters or other items. In an embodiment, the probabilities associated with the set of selections depend on the selections previously selected by the user. In one implementation, as the user inputs the letters of a word, step 415 compares the letters of the partially input word with a dictionary module or other data structure. The dictionary module provides step 415 with the relative probabilities of the letters available to be selected based on the letters of the partially input word. In further embodiments, the probabilities associated with the set of letters depend upon additional factors, such as the context of the input and one or more words or items previously entered.

In an embodiment, the dictionary module is constructed by processing a representative sample of typical inputs. For example, if the user interface is to be employed in a wireless phone, the sample of inputs may include text messages, e-mails, chat room logs, and other communications. In an embodiment, the representative sample of inputs can be tailored for the intended usage and users of the user interface. For example, if the user interface is included in a device intended for business users, the representative sample can include documents and communications typically used by business users. This representative sample of inputs may be different than that used for a device intended for teenagers.

In an embodiment, the dictionary module represents the probability of each letter being selected as the ratio between the usage count and the word count for a given sequence of letters. The usage count is the number of times a word using a given sequence of letters has been used. The word count is the total number of words in the representative sample that can be formed using the given sequence of letters. In one implementation, the dictionary module uses a tree data structure. In this implementation, the sequence of letters for a partially input word corresponds to a path between nodes in the tree data structure. The node at the beginning of the path represents the first letter selected by the user and the node at the end of the path represents the most recent letter selected. Branches from last node in the path correspond with the possible letters available to be selected following a given sequence of letters. Each branch has a probability, expressed for example as the ratio of usage count to word count, representing its corresponding letter's relative probability.

Step 420 creates a new mapping for the set of possible selections. In an embodiment, this mapping is based upon the relative probabilities of associated with the set of selections, with selections having higher probabilities being allocated larger ranges of input values. As discussed above, the mapping of input values to possible the set of possible selections can be expressed as a table or other data structure associating a range of input values with each possible selection. Alternatively, step 420 can specify parameters of a weighting function for each selection based upon the selection's probabilities. In an embodiment, the range of input values for each selection is proportional to the selection's probability relative to the other selections. In further embodiments, the range of input values associated with a selection is limited by a maximum and/or minimum range size, so as to ensure that the user can select any of the possible selections, regardless of how small its associated probability is.

Step 425 displays the set of possible selections. Step 425 emphasizes the possible selections having greater probabilities. In an embodiment, the set of possible selections is displayed as illustrated in FIGS. 2 and 3A-B. Step 425 allocates additional screen space for selections associated with higher probability values. In an embodiment, the arrangement of selections corresponds with the mapping determined in step 420. In further embodiments, step 425 further visually emphasizes selections with higher probability values. For example, step 425 may apply a radial offset to the position of letters with higher probability values. In another embodiment, step 425 may apply a different color or an animation to letters or other types of selections having higher probability values.

Following step 425, step 430 waits to receive another input value from the user via the input device. Upon receiving the next input value, the method 400 returns to step 405. During subsequent iterations of method 400, the mapping created in a previous iteration of step 420 can be applied in the current iteration of step 410.

In a further embodiment, the user can provide an input value indicating that a given sequence of selections is complete. For example, the user can select a space character to indicated that a word is complete. In response, method 400 can reset the mapping between input values and selections to a default mapping. In an additional embodiment, upon completion of a selection or a sequence of selections, the dictionary module is updated accordingly. For example, if the user enters a word using the user interface, the word is added to the dictionary module or, if the word is already in the dictionary module, the associated usage count is updated accordingly.

In a further embodiment of method 400, if the number of possible words in the dictionary module that match a partially input word is relatively small, method 400 displays a list of the possible words. The user can then use the input device to select one of the possible words on the list. In a further embodiment, the list of possible words is displayed simultaneously with the set of letters, so that the user can select one of the possible words on the list or, in the event the word is not in the dictionary module, additional letters.

Figure 5:
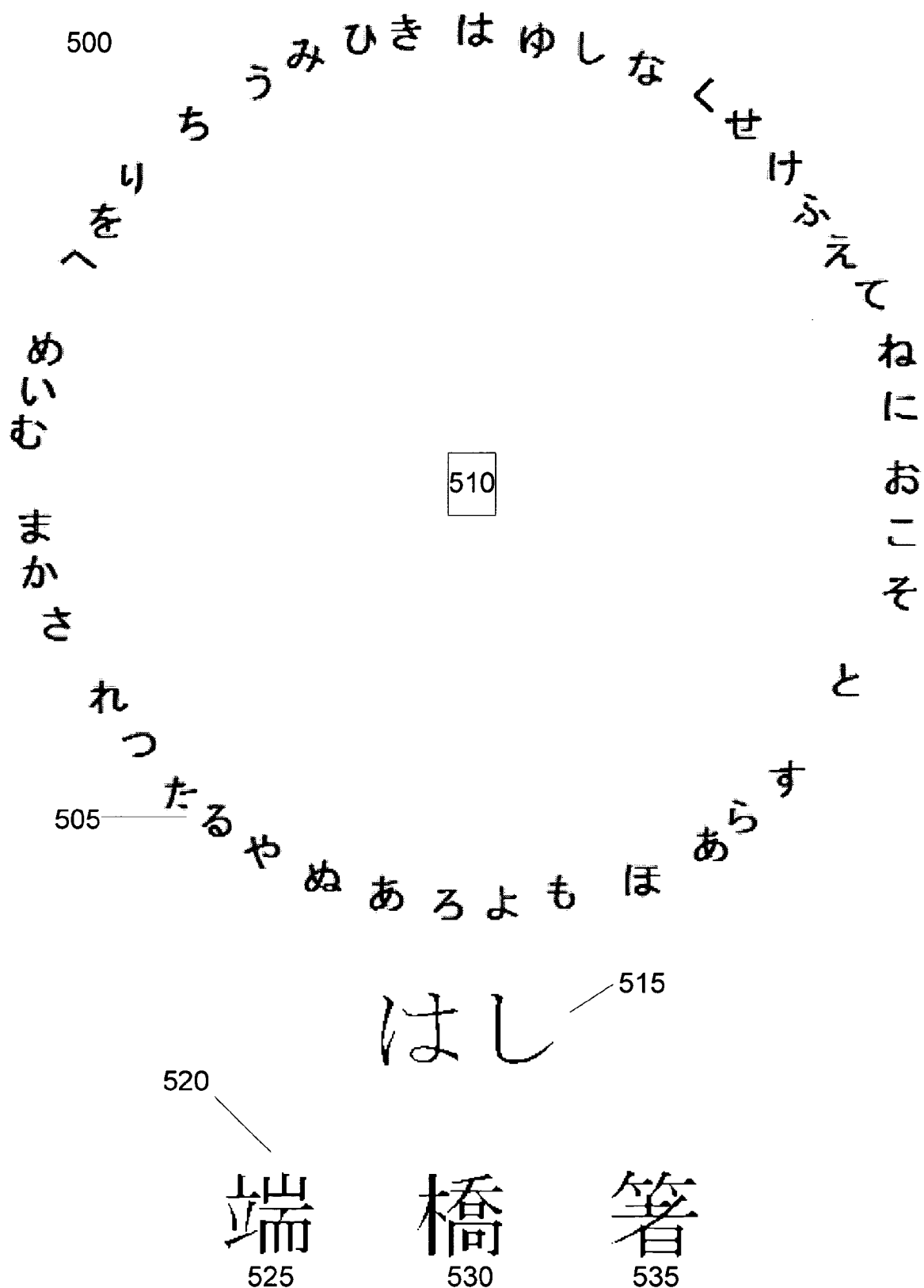
FIG. 5 illustrates an example screen display of a user interface suitable for use with languages having a large number of characters according to an embodiment of the invention.

Languages such as Japanese often have multiple different sets of characters for writing words. In Japanese, there are two syllabaries, or phonetic alphabets, which are referred to collectively as kana. Additionally, the Japanese language includes thousands of kanji characters used to represent words. FIG. 5 illustrates an example screen display 500 of a user interface suitable for use with languages having a large number of characters according to an embodiment of the invention. Although this example is discussed with reference to the Japanese language, similar implementations of this example and the other embodiments of the invention discussed herein can be applied to other languages, including Chinese and Korean.

Screen display 500 includes a set of characters 505 arranged in a circle. In this example screen display 500, the set of characters 505 include characters of the hiragana, which is one of the sets of kana characters. The user interface can distribute the set of characters 505 around the circle as described above, with characters being allocated different amounts of space based on the each character's relative probability of being selected. Additionally, characters with higher probabilities of being selected can be visually distinguished by color, animation, spacing, and/or other means.

The user interface includes a pointer 510 used to select characters from the set of characters 505. As the user selects a sequence of characters from the set of characters 505, the sequence of selected characters is displayed in area 515. In an embodiment, the dictionary module discussed above provides a list of one or more kanji characters corresponding with the partially or completely entered kana word. When the number of possible kanji characters corresponding to a sequence of kana characters is sufficiently small (depending for example on the available space and resolution of the screen), the user interface displays a list of kanji characters corresponding to the sequence of kana characters.

Example screen display 500 includes a kanji display area 520. The kanji display area 520 displays one or more kanji characters corresponding to the kana characters previously input and displayed in area 515. The user can select the appropriate kanji character in the kanji display area using the pointer 510.

Kanji display area 520 can include multiple characters corresponding to the kana characters in area 515. There may be multiple characters in kanji display area 520 because the word in area 515 is incomplete or because there are different words with similar pronunciations. For example, the Japanese word "hashi" can mean either "edge," "bridge," or "chopsticks." The kana version of this word is displayed in area 515. Continuing with this example, the kanji characters corresponding with these alternate meanings, 525, 530, and 535, respectively, are shown in the kanji display area 520.

Figure 6:
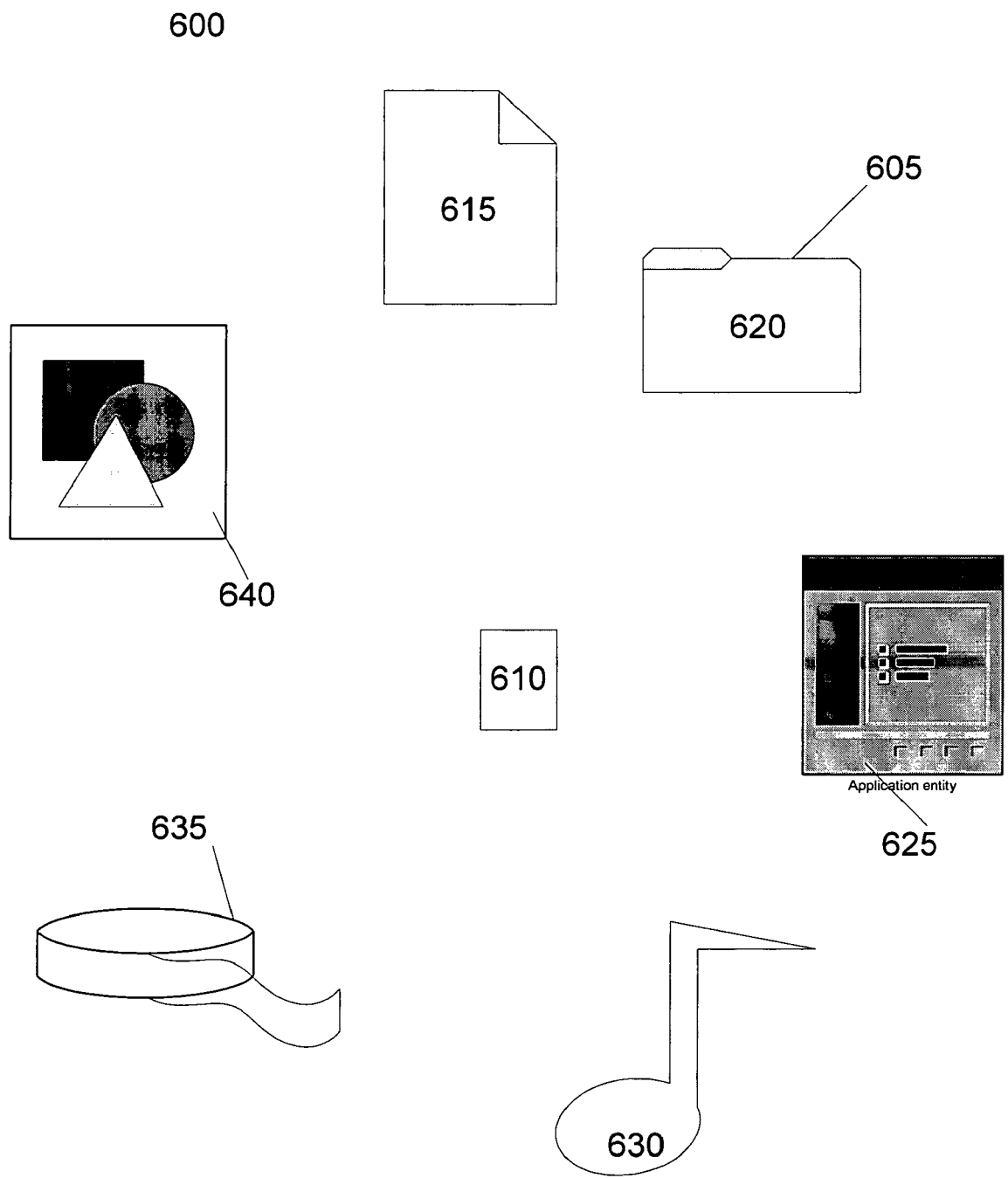
FIG. 6 illustrates an example screen display of a user interface suitable for selecting non-text inputs.

In addition to providing an interface for entering text, embodiments of the invention can be adapted to non-text selections. FIG. 6 illustrates an example screen display 600 of a user interface suitable for selecting non-text inputs. Example screen display 600 illustrates an application of the user interface to select data and applications. As described above, a set of selections 605 is arranged in a circle. Users can manipulate a pointer 610 to select individual entities in the set of selections 605. In this example, the set of selections 605 includes a data file 615, a directory 620, an application 625, music 630, movies 635, and pictures 640. These entities are provided as examples and the set of selections 605 can include any number of entities representing any type of application or data capable of being manipulated by a computer or other electronic information processing device.

Similar to the embodiments discussed above, entities in the set of selections 605 can be arranged according to their probability of being selected. In this embodiment, the dictionary module tracks the relative frequency of use of each entity in the set of selections and determines a relative probability value for each entity accordingly. In additional embodiments, entities having higher probabilities of being selected are visually distinguished by color, position, icon size, animation, or any other factor known in the art.

In an embodiment, each set of selections functions as a menu or sub-menu. In this embodiment, each entity in the set of selections 605 can represent either a single item, such as a single data file or application, or a group of data files or applications having similar attributes. For example, music entity 630 can represent a user's entire digital music collection. In a further embodiment, after a user selects an entity from the set of selections 605, the user interface can display additional sets of selections to further narrow the user's selection. For example, after selecting the music entity 630, an embodiment of the user interface can display a new set of selections including entities corresponding with specific songs in the user's digital music collection.

Figure 7:
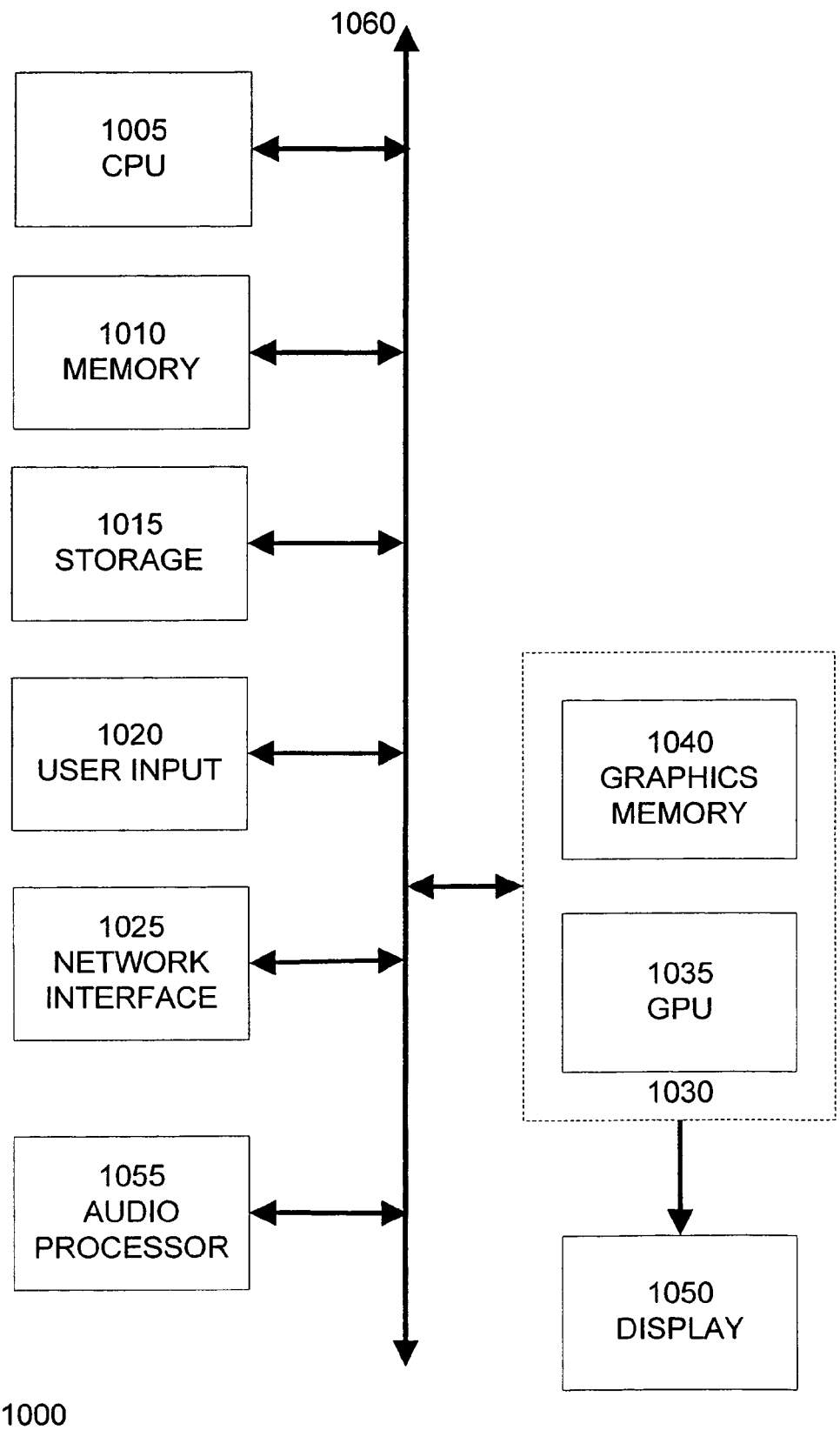
FIG. 7 illustrates an example computer system suitable for implementing an embodiment of the invention.

FIG. 7 illustrates an example computer system 1000 suitable for implementing an embodiment of the invention. FIG. 7 is a block diagram of a computer system 1000, such as a personal computer, video game console, personal digital assistant, handheld computer, electronic organizer, personal digital assistant, portable game system, digital video or music system, wireless phone or other electronic device, suitable for practicing an embodiment of the invention. Computer system 1000 includes a central processing unit (CPU) 1005 for running software applications and optionally an operating system. CPU 1005 may be comprised of one or more processing cores. Memory 1010 stores applications and data for use by the CPU 1005. Optional storage 1015 provides non-volatile storage for applications and data and may include fixed disk drives, removable disk drives, flash memory devices, and CD-ROM, DVD-ROM, Blu-ray, HD-DVD, or other optical storage devices. User input devices 1020 communicate user inputs from one or more users to the computer system 1000, examples of which may include keyboards, mice, joysticks, touch pads, touch screens, still or video cameras, buttons and switches, and/or microphones. Optional network interface 1025 allows computer system 1000 to communicate with other computer systems via an electronic communications network, and may include wired or wireless communication over local area networks and wide area networks such as the Internet. An optional audio processor 1055 is adapted to generate analog or digital audio output from instructions and/or data provided by the CPU 1005, memory 1010, and/or storage 1015. The components of computer system 1000, including CPU 1005, memory 1010, data storage 1015, user input devices 1020, network interface 1025, and audio processor 1055 are connected via one or more data buses 1060.

A graphics subsystem 1030 is further connected with data bus 1060 and the components of the computer system 1000. In an alternate implementation, all or portions of the graphics subsystem 1030 can be integrated with the CPU 1005 or other components of computer system 1000. The graphics subsystem 1030 includes a graphics processing unit (GPU) 1035 and graphics memory 1040. Graphics memory 1040 includes a display memory (e.g., a frame buffer) used for storing pixel data for each pixel of an output image. Graphics memory 1040 can be integrated in the same device as GPU 1035, connected as a separate device with GPU 1035, and/or implemented within memory 1010. Pixel data can be provided to graphics memory 1040 directly from the CPU 1005. Alternatively, CPU 1005 provides the GPU 1035 with data and/or instructions defining the desired output images, from which the GPU 1035 generates the pixel data of one or more output images. The data and/or instructions defining the desired output images can be stored in memory 1010 and/or graphics memory 1040. In an embodiment, the GPU 1035 includes 3D rendering capabilities for generating pixel data for output images from instructions and data defining the geometry, lighting, shading, texturing, motion, and/or camera parameters for a scene. The GPU 1035 can further include one or more programmable execution units capable of executing shader programs.

The graphics subsystem 1030 periodically outputs pixel data for an image from graphics memory 1040 to be displayed on display device 1050. Display device 1050 is any device capable of displaying visual information in response to a signal from the computer system 1000, including CRT, LCD, plasma, and OLED displays. Computer system 1000 can provide the display device 1050 with an analog or digital signal.

Further embodiments can be envisioned to one of ordinary skill in the art from the specification and figures. For example, the above described user interface can arrange the set of selections around other types of shapes. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer program product embedded in a computer memory and including instructions that, when executed by a processor, cause the processor to generate a user interface for a system comprising:
    a pointer adapted to be positioned by a user via an input device; and
    a set of entities arranged in a single radial pattern, each entity being associated with a selection probability the entity associated with a selection area being selected as an input in response to the pointer contacting the selection area,
    wherein each entity associated with a selection area is a character used to write a language, and
    wherein, in response to each input specifying at least one character, a new selection probability is determined for at least a first portion of the set of entities by comparing the input to a set of possible language results beginning with the at least one character specified by the input, the selection area of at least a second portion of the entities being adjusted to correspond to a respective new selection probability.

2. The user interface of claim 1, wherein each of the set of entities is arranged according to its associated selection probability.

3. The user interface of claim 1, wherein the selection probabilities of the set of entities is further determined at least in part from a set of one or more previously-selected entities.

4. The user interface of claim 3, further including a dictionary module, wherein the set of possible language results includes a dictionary module.

5. The user interface of claim 1, wherein a visual cue is applied to each of at least a portion of the set of entities based on its associated selection probability, the visual cue adapted to visually distinguish the entity.

6. The user interface of claim 5, wherein the visual cue includes a color.

7. The user interface of claim 5, wherein the visual cue is a radial offset applied to the position of the entity.

8. The user interface of claim 1, further comprising:
    a list of words adapted to be displayed in response to a sequence of entities selected by a user.

9. The user interface of claim 8, wherein the sequence of entities forms a portion of a word being input by a user and each of the list of words matches the portion of the word.

10. The user interface of claim 8, wherein the sequence of entities forms at least a portion of a word using a first set of characters and each of the list of words corresponds to the sequence of entities using a second set of characters.

11. The user interface of claim 1, wherein the input device includes a joystick.

12. A method of processing user input provided via an input device, the method comprising:
    providing for display a set of entities arranged in a single radial pattern and associated with a selection area;
    receiving at least one input value from an input device;
    mapping each input value to one of the set of entities, each entity corresponding to a character used to write a language;
    determining a selection probability for each of at least a first portion of the set of entities by comparing each input value to a set of possible language results beginning with the character corresponding to each input value; and
    adjusting the selection area for at least a second portion of the set of entities to correspond to a respective selection probability.

13. The method of claim 12, wherein mapping the input value to one of the set of entities uses a default mapping.

14. The method of claim 12, wherein displaying the set of entities includes arranging the set of entities in a radial pattern such that each of at least a portion of the set of entities is allocated space in the pattern proportional to its selection probability.

15. The method of claim 12, wherein determining a set of selection probabilities includes a dictionary module adapted to determine the set of selection probabilities for the set of entities based on at least the entity corresponding to the input value and a representative sample of sequences of entities selected by typical users.

16. The method of claim 12, wherein displaying the set of entities includes applying a visual cue to each of at least a portion of the set of entities based on its associated selection probability, the visual cue adapted to visually distinguish the entity.

17. The method of claim 16, wherein the visual cue includes a color.

18. The method of claim 16, wherein the visual cue is a radial offset applied to the position of the entity.

19. The method of claim 12, further comprising:
displaying a list of words in response to a sequence of entities selected by a user.

20. The method of claim 19, wherein the sequence of entities forms a portion of a word being input by a user and each of the list of words matches the portion of the word.

21. The method of claim 19, wherein the sequence of entities forms at least a portion of a word using a first set of characters and each of the list of words corresponds to the sequence of entities using a second set of characters.

* * * * *